United States Patent
Messenger et al.

(10) Patent No.: US 10,759,348 B2
(45) Date of Patent: Sep. 1, 2020

(54) REAR VIEW ASSEMBLY FOR A MOTOR VEHICLE WITH INTERCHANGEABLE APPROACH LAMP

(71) Applicant: MOTHERSON INNOVATIONS COMPANY LIMITED, London (GB)

(72) Inventors: Jacob Heath Messenger, Lonsdale (AU); Simon Belcher, Lonsdale (AU); Arne Schmierer, Stuttgart (DE); Volker Erhart, Stuttgart (DE); Tobias Schwenger, Stuttgart (DE); Mikhail Kudryavtsev, Stuttgart (DE); Levente Acs, Stuttgart (DE)

(73) Assignee: MOTHERSON INNOVATIONS COMPANY LIMITED, London (GB)

( * ) Notice: Subject to any disclaimer, the term of this patent is extended or adjusted under 35 U.S.C. 154(b) by 0 days.

(21) Appl. No.: 16/499,039

(22) PCT Filed: Mar. 29, 2018

(86) PCT No.: PCT/EP2018/058137
§ 371 (c)(1),
(2) Date: Sep. 27, 2019

(87) PCT Pub. No.: WO2018/178268
PCT Pub. Date: Oct. 4, 2018

(65) Prior Publication Data
US 2020/0114825 A1    Apr. 16, 2020

(30) Foreign Application Priority Data

Mar. 31, 2017   (AU) ................................ 2017901169
Dec. 15, 2017   (DE) ........................ 10 2017 130 246

(51) Int. Cl.
*B60R 1/12*      (2006.01)
*F21S 43/14*     (2018.01)
(Continued)

(52) U.S. Cl.
CPC .......... *B60R 1/1207* (2013.01); *B60Q 1/2665* (2013.01); *B60R 1/06* (2013.01);
(Continued)

(58) Field of Classification Search
CPC ....... B60R 1/1207; B60R 1/06; B60Q 1/2665; B60Q 1/24
See application file for complete search history.

(56) References Cited

U.S. PATENT DOCUMENTS 8,072,318 B2   12/2011  Lynam et al.
9,434,313 B2    9/2016  Minikey et al.
(Continued)

FOREIGN PATENT DOCUMENTS

ES         2458428 A1    5/2014
WO     WO 2016/012651 A1    1/2016

OTHER PUBLICATIONS

International Search Report dated Nov. 26, 2018 of International application No. PCT/EP2018/058137.
(Continued)

*Primary Examiner* — Donald L Raleigh
(74) *Attorney, Agent, or Firm* — Jones Day

(57) ABSTRACT

A system for providing interchangeable approach lamps for use with an external rear view assembly mounted to a motor vehicle includes a first approach lamp module and a second approach lamp module. the second approach lamp module differs from the first approach lamp module by being a projecting or logo approach lamp module due to its projection assembly for projecting a logo or a mask.

16 Claims, 8 Drawing Sheets

(51) Int. Cl.
*F21S 43/27* (2018.01)
*F21S 43/20* (2018.01)
*B60Q 1/26* (2006.01)
*B60R 1/06* (2006.01)

(52) U.S. Cl.
CPC .............. *F21S 43/14* (2018.01); *F21S 43/26* (2018.01); *F21S 43/27* (2018.01)

(56) References Cited

U.S. PATENT DOCUMENTS

| | | | |
|---|---|---|---|
| 2002/0126497 A1 | 9/2002 | Pastrick | |
| 2005/0265037 A1* | 12/2005 | Newton | B60Q 1/2665 362/494 |
| 2005/0281043 A1* | 12/2005 | Eisenbraun | B60Q 1/2665 362/494 |
| 2006/0291225 A1* | 12/2006 | Todd | B60Q 1/2665 362/494 |
| 2012/0081915 A1* | 4/2012 | Foote | B60Q 1/245 362/494 |
| 2015/0224919 A1 | 8/2015 | Sobecki et al. | |
| 2017/0066379 A1 | 3/2017 | Herrmann | |
| 2017/0101048 A1* | 4/2017 | Chen | B60Q 1/2665 |
| 2017/0136953 A1* | 5/2017 | Tseng | B60R 1/1207 |

OTHER PUBLICATIONS

Written Opinion dated Nov. 26, 2018 of International application No. PCT/EP2018/058137.

\* cited by examiner

Figure 2DFigure 2E

REAR VIEW ASSEMBLY FOR A MOTOR VEHICLE WITH INTERCHANGEABLE APPROACH LAMP

CROSS-REFERENCE TO RELATED APPLICATIONS

This application is a National Stage Entry of International Patent Application No. PCT/EP2018/058137, filed Mar. 29, 2018, which claims the benefit of foreign priority to Australian Patent Application No. 2017901169, filed Mar. 31, 2017 and German Patent Application No. DE 10 2017 130 246, filed Dec. 15, 2017, each of which is hereby incorporated by reference in its entirety for all purposes.

BACKGROUND

1. Field of the Invention

The present disclosure relates to an external rear view assembly. For example, a system for providing interchangeable approach lamps for use with an external rear view assembly is described. Also, an approach lamp module for use in such a system, an external rear view assembly for a motor vehicle with such a system and a method of replacing an installed approach lamp for use in such a system are described.

2. Related Art

An external rear view assembly for a motor vehicle comprises at least one reflective element such as a mirror, and/or a camera in cooperation with a display, with the display being arranged within the external rear view assembly attached at a side of the motor vehicle or within the motor vehicle. A conventional rear view side mirror and a camera pod are examples of external rear view assemblies.

A rear view assembly for a motor vehicle offers a view of the area behind the motor vehicle at least in compliance with the legal provisions and belongs to a sub-group of assemblies for an indirect view. These provide images and views of objects which are not in the driver's direct field of view, i.e., in directions opposite of, to the left of, to the right of, below and/or above the driver's viewing direction. The driver's view cannot be fully satisfactory, in particular also in the viewing direction; the view can, for example, be obstructed by parts of the driver's own vehicle, such as parts of the vehicle body, in particular, the A-pillar, the roof construction and/or the bonnet and the view may be obstructed by other vehicles and/or objects outside the vehicle that can obstruct the view to such an extent that the driver is not able to grasp a driving situation to his/her full satisfaction or only incompletely. It is also possible that the driver is not able to grasp the situation in or outside of his/her viewing direction in the way required to control the vehicle according to the situation. Therefore, a rear view assembly can also be designed in such a way that it processes the information according to the driver's abilities in order to enable him/her to grasp the situation in the best possible manner.

Different functions and devices can be built into rear view assemblies and/or controlled with the help of rear view assemblies wherein cameras are included as well. The functions and devices for improving, enhancing, and/or maintaining the functionality of the rear view assembly under normal or extreme conditions are particularly useful. They can comprise heating or cooling systems, cleaning materials such as wipers, liquid and/or gaseous sprays, actuator means for moving the rear view assembly and parts thereof such as a display, a camera system and/or parts of a camera system, for example, comprising lenses, filters, light sources, adaptive optics such as formable mirrors and/or actuator means for the induction of movements of other objects, for instance, parts of the vehicle and/or objects surrounding the vehicle.

Moreover, the rear view assembly can comprise linear guiding devices and/or rotating wheels, such as a filter wheel, for exchanging optical elements, for example, comprising lenses, mirrors, light sources, sensors, adaptive optics such as formable mirrors and/or filters.

Further devices can be integrated in rear view assemblies and/or further devices can be controlled by means of rear view assemblies, such as any kind of light module comprising an external light module, an internal light module, a front light, a rear light, fog lights, a brake light, an accelerator light, a blinking light, a logo light, an apron lighting, a ground light, a puddle light, a flash light, a navigation light, a position light, an emergency light, headlights, a green light, a red light, a warning light, a blinking light module, an approach light, a search light, an information light, an indicator and/or the like. Further examples for functions and devices which can be integrated in or controlled by rear view assemblies can be a fatigue detection system, a system to detect momentary nodding off, a distance and/or speed determination system, for example, a LIDAR (light detection and ranging) system, a blind angle indication system, a lane-change assistance system, a navigation assistance system, a tracking assistance system, a man-machine interaction system, a machine-machine interaction system, an assistance system for emergency and precautionary measures, such as an accident prevention assistance system, a countermeasure assistance system, a braking assistance system, a steering assistance system, an accelerator assistance system, an escape assistance system which, for example, comprises a catapult seat system, a direction indicator, a blind angle indicator, an approach system, an emergency brake system, a charging status indicator, a vehicle mode system, for instance, comprising a sports-mode system, an economy-mode system, an autonomous driving-mode system, a sleep mode system and/or an anti-theft system, a vehicle-locked indication system, a vehicle-stolen indicator, a warning signal system, a temperature indicator system, a weather indication system, a traffic light signal system, a fuel status system and/or any combination thereof.

Lighting devices for rear view assemblies and/or associated fibre-optic light guides are described in the German patent application No. 102012108488, in the German patent application No. 102012104529, in the German patent application No. 102012107833, in the German patent application No. 102012107834, in European patent No. 2738043, in European patent No. 2947378, in the international patent application No. 2015/173695, in the European patent application No. 3045944, in the U.S. patent application Ser. No. 15/228,566, in the U.S. patent application Ser. No. 15/000,733, in the international patent application No. 2016/147154, in the U.S. patent application Ser. No. 15/256,532, in the German patent application No. 102015115555, in the European patent application No. 3144183, of the applicant.

A camera module can in particular comprise a multitude of different optical elements, inter alia, comprising a multitude of different sensors and light sources as well as housing parts. The housing of a camera module can be made of plastic, metal, glass, another suitable material and/or any combination thereof and can be used in combination with the techniques for changing or modifying the properties of the material or the material surface. Housings are, for example, disclosed in the German patent application No. 102016108247.3.

The camera can, for example, comprise CCD or CMOS or light field sensors as they are, for example, described in the German patent application No. 102011053999 and in U.S. Pat. No. 6,703,925. A certain sector of the sensor can also be reserved for different purposes, for instance, for detecting a test beam, as disclosed in U.S. Pat. No. 8,031,224.

The optical elements can be formed or designed from any type of glass or any other suitable material. Here, glass is used in the sense of a non-crystalline amorphous solid body showing a glass transition when being heated towards the liquid state. It comprises, for example, the group of polymer glasses, metal glasses, silicon oxide glasses, but also any other suitable material can be used that shows the glass transition. The glass can be either plane, wedge-shaped, rectangular, cylindrical, spherical, conical, elliptical, and/or circular, as it is, for example, described in the German patent application No. 102016108247.3 and the German patent application No. 102011103200, or may be formed according to the different requirements or lens types. As non-limiting examples, camera modules can be equipped with lenses such as wide-angle or fisheye lenses, which are suited to provide peripheral pictures, as described in the U.S. patent application Ser. No. 15/281,780 and the U.S. patent application Ser. No. 13/090,127, a Fresnel lens or micro lenses, as described in the German patent application No. 102011053999, or a TIR (total intern reflection) lens, as described in U.S. Pat. No. 8,740,427. Another type of optical elements which are notoriously used in camera modules, are optical fibres, in particular, in the form of fibre bundles and preferably in the form of fibre bundles with an optical head, such as described in the U.S. patent application Ser. No. 09/771,140. Different processes can be applied in order to manufacture such optical elements, such as the process described in U.S. Pat. No. 8,460,060. The optical elements can be transparent as, for instance, in U.S. Pat. No. 8,031,224, in the German patent application No. 102016108247.3 and in the U.S. patent application Ser. No. 13/242,829. However, the optical elements can be semi-transparent as well, as described in the U.S. patent application Ser. No. 09/771,140 and the U.S. patent application Ser. No. 13/090,127. Furthermore, the optical elements can be completely or partly coated with different types of coatings in order to achieve different effects, such as anti-reflection coatings, see U.S. Pat. No. 8,031,224, reflection coatings on a chrome basis, see U.S. Pat. No. 9,181,616, and other coatings, for example, for polymeric substrates as described in the U.S. patent application Ser. No. 14/936,024 and in the U.S. patent application Ser. No. 15/124,310. The optical elements preferably consist of a scratch-proof material, as, for example, described in the German patent application No. 102016108247.3. In certain spots of the optical elements, the optical elements can have decoupling structures, and an optical film, an extrusion film for example, and a formed coating can be applied, as described in the German patent application No. 102011103200. A coating for spectral and tension control is described in the U.S. patent application Ser. No. 15/124,310. Different filters can be integrated in the optical elements, such as grey filters or polarisation filters, which are described in the U.S. patent application Ser. No. 14/809,509. Electrochromic substrates, polymer electrolytes, and other charge-conductive media can be comprised for the optical elements on the basis of the descriptions, as disclosed in the European patent application No. 08103179.1, the European patent No. 2202826, the U.S. Pat. No. 7,999,992, and the U.S. Pat. No. 8,537,451.

The camera module can also be equipped with devices for controlling the light intensity, as described, for example, in the U.S. patent application Ser. No. 14/809,509 and comprise light level amplifier tubes, as described in the U.S. patent application Ser. No. 09/771,140. The electrochromic substrates and apparatuses used in the European patent application No. 08103179.1, the European patent No 2202826, the U.S. Pat. No. 7,999,992, and the U.S. Pat. No. 8,537,451 can also be used for this purpose just like a transflector for transmitting or reflecting light on the basis of a respective input signal, as described in the German patent application No. 102016106126.3.

The camera module or a cover adapted to the camera module can be moved by different actuators, drive units, and/or a flexible track, as described, for instance, in the German patent application No. 102016108247.3 and the U.S. patent application Ser. No. 15/281,780. Moreover, the camera module can also comprise cleaning elements in order to clean the outward pointing optical element exposed to the environment. The cleaning element can, for example, contain wipers, brushes, lips, nozzles, ventilators, and similar elements, as they are described in the European patent application No. 14165197.6, the U.S. patent application Ser. No. 15/281,780, the German patent application No. 102016108247.3, the European patent application No. 13163677.1, the European patent application No. 15173201.3, and European patent No. 1673260. The cleaning devices are not limited as to their composition and can, for example, comprise any kind of tissues, elastomers, sponges, brushes, or combinations thereof. Special wiper elements that comprise wiper arms, wiper blades, wiping cloths, wiping tissues, and combinations thereof are described in the European patent application No. 14165197.6. A wiping element can, for example, be controlled according to the process described in the European patent application No. 130164250.6. A reservoir for keeping a cleaning liquid, as described in the European patent application No. 14165197.6, can be fixed to or integrated in the camera module in order to supply the optical elements of the camera module with the cleaning liquid.

Different processes can be used in order to detect dirt or other blurs which impede or impair the functioning of the camera module, as described in the U.S. Pat. No. 8,395,514, the European patent No. 1328141, and the U.S. Pat. No. 8,031,224. In addition, light sources can be built or integrated in the camera module in order to increase the visibility of surrounding objects, to measure distances and directions, and to detect dirt, as described in the U.S. Pat. No. 8,031,224, the U.S. patent application No. 62/470,658, and the U.S. patent application Ser. No. 09/771,140.

It is known to provide such cameras with heating devices and/or protection glasses. For this purpose, heating foils are, for instance, glued onto or laminated with the protection glass. The manufacturing of such a solution is costly and, due to the low thermal mass of such a heating foil, it has only a low heating capacity. Different heating means, such as heating coils, heating devices integrated in the lens mounting or lining or other heating elements can be used in order to prevent condensation and icing on the surface of optical elements, such as described in the German patent application No. 102016108247.3 and the U.S. patent application Ser. No. 62/470,658.

Waterproof seals against weather conditions as well as against the influence of washing processes with cleaning agents, solvents, and high-pressure cleaners can be used for the housing of the camera module, as described, for example, in the U.S. patent application Ser. No. 13/090,127. Alternatively, the housing can be made in one piece, which consists of plastic and a conductive material, the conductive material being spread in the plastic material in order to form a conductive mass, enabling a power source, preferably a DC voltage source, to be connected with the body via at least two electrodes and to warm up the body accordingly. A conductive track can be embedded in the plastic parts of the camera module, as described in the European patent No. 1328141 and the U.S. Pat. No. 7,083,311.

The camera module can comprise an energy collection system, as, for example, described in the European patent application Ser. No. 09171683.7. An error detection system for electric loads, as it is described in the U.S. Pat. No. 8,487,633, can be used in order to detect a failure of the camera module.

Different types of fixings can be used in order to attach the camera module to the vehicle or to other components, such as the snap-in connection described in European patent No. 2233360.

Different controlling means and analysis devices can be used, for example, the calculation units described in the U.S. patent application Ser. No. 13/090,127, the German patent application No. 102016106126.3, the German patent application No. 102011053999, the European patent application No. 2146325, and the U.S. Pat. No. 8,849,104. In addition, the HDR (high dynamic range) technology according to the U.S. patent application Ser. No. 14/830,40 can be used.

Additional functional elements and/or decorative elements, such as logo projectors, are thus increasingly integrated in rear view assemblies of vehicles. By means of such a logo projector, a symbol, for example the manufacturer's logo, can be projected onto the road. For this purpose, the logo projector comprises a light source, a mask, and/or a slide for determining the logo as well as a projection lens. In order to make sure that the logo can be projected onto the road without any distortions, the position of the logo projector must be exactly defined. However, since, apart from the internal tolerance of the logo projector, i.e., the relative position between the mask and the lens, there are usually further tolerances, for example between the logo projector and the mirror housing, between the mirror head and the mirror foot, as well as between the mirror foot and the vehicle body, the position of the logo projector is not always exactly defined. This may result in undesired angular deviations and/or distortions of the projected logo.

Some rear view side mirrors incorporate approach or puddle lamps within the side mirror housing which are used to project light downward onto the ground adjacent a vehicle. Standard (or basic) approach lights have a light source such as an LED that is directed through an aperture in the lower surface of the side mirror. The light source is held a desired fixed distance from the aperture and may use simple optical arrangements such as a light pipe to direct light through the aperture. Projector approach lamps are a more sophisticated version of an approach lamp that uses a lens arrangement incorporating a filter, mask, or screen (or similar) to project a logo or image through the aperture. Projection of the logo requires the use more complicated optical arrangements compared with standard (or basic) approach lamps, and thus such projector approach lamps are typically physically larger and more expensive than standard approach lamps.

The available space within a rear view side mirror for an approach lamp is typically quite limited, and the approach lamp module must fit around or in spaces between the side mirror components such as mirrors and motors, and as a result the approach lamp module and side mirror assemblies are custom designed to match. Approach lamp modules are typically constructed as modular units with the different approach lamp variants (eg standard, logo) each having a different size and different electrical requirements (eg current/voltage specifications). During manufacture or repairs the appropriate side mirror assembly (or components) for the desired approach lamp type must first be fitted to the vehicle, and then the matching approach lamp module must be inserted/mounted into the matching side mirror assembly.

This drives significant costs in design, tooling and stock control as separate side mirror assemblies need to be designed for each type of approach lamp that can be fitted to the vehicle. Examples of components affected include the apertures and interfaces in case lowers and bases where the lamp is typically mounted, the case frames that generally try to occupy the surrounding area; and connectors/routing of wire harnesses to provide power to the lamp. In some cases, mounting adaptors have been developed to allow projection and standard approach lamps to mate to common mirror components, but this method also incurs additional design and tooling costs. Furthermore, recent legal requirements limit the visibility of the apparent surface of white light sources projected from the side mirror. The general solution is thus to recess the lamp into the mirror to limit its visibility.

There is thus a need to provide improved systems for mounting approach lamps in external rear view assemblies, or at least provide a useful alternative to existing solutions. Further, there is the need to reduce distortions due to misalignments.

SUMMARY

The present disclosure provides a system for providing interchangeable approach lamps for use with an external rear view assembly mounted to a motor vehicle, the system comprising: a first approach lamp module comprising a first housing comprising a front face, a rear face, a first side face, a second side face, a proximal face and a distal face, the proximal face comprising an aperture for receiving a power cable; a first set of mounting surfaces located on the first housing, the first set comprising one or more mounting surfaces; a first printed circuit board mounted adjacent the rear face, the first printed circuit board further comprising a power connector, a first electronic circuit and a first light source mounted on the first printed circuit board, a first optical assembly mounted to receive light from the first light source and comprising a first light exiting surface projecting out of the front face of the first housing; and a second approach lamp module comprising a second housing comprising a front face, a rear face, a first side face, a second side face, a proximal face and a distal face, the proximal face comprising an aperture for receiving a power cable; a second set of mounting surfaces located on the second housing, the second set comprising one or more mounting surfaces; a second printed circuit board mounted adjacent the rear face, the second printed circuit board further comprising a power connector, a second electronic circuit and a second light source mounted on the second printed circuit board, a second optical assembly mounted to receive light from the second light source and comprising a projection assembly for projecting a logo or a mask, and a second light exiting surface projecting out of the front face of the second housing, wherein the locations of each of the first set of mounting surfaces and the locations of each of the second set of mounting surfaces are identical, and a location and a size of the first light exiting surface is identical to a location and size of the second light exiting surface and a location of the first light source is identical to a location of the second light source such that a distance from the rear face of the first housing to the first light exiting surface is the same as the distance from the rear face of the second housing to the second light exiting surface, each location relative to the locations of each of the first set of mounting surfaces, so that in use, each of the first approach lamp module and the second approach lamp module are mounted in the same location in the external rear view assembly and project light through an external aperture in the external rear view assembly to allow interchanging of the approach lamp modules.

It is preferred that a profile shape of the first printed circuit board is the same as a profile shape of the second printed circuit board, and/or the shape of the first printed circuit board is the same as the shape of the second printed circuit board, with the location of the power connector and light source on each printed circuit board being identical such that for both the first and second approach lamp modules the location of the power connector relative to the aperture for receiving a power cable is identical.

It is also proposed that the shape of the assembled first approach lamp module is the same as the shape of the assembled second approach lamp module.

It is further proposed that each of the first and second housing comprises a pair of mounting surfaces, one located on the respective first side face and one located opposite on the respective second side face.

It is preferred that the system further comprises an interfacing component comprising one or more mounts for mounting the interfacing component to an external rear view assembly, and a set of mounting surfaces matching the first set of mounting surfaces on the first housing and the second set of mounting surfaces on the second housing.

It is proposed that the first optical assembly is either moulded as a single piece or as two pieces.

Embodiments of the present disclosure can be characterized in that the first light exiting portion comprises a disk like lens portion with a pair of cut-out locating portions, and a stem portion extending down from the disk like lens portion, and a mounting projection extending laterally from the disk like lens portion, and the front face of the first housing comprises an light exiting aperture with a pair of locating projections shaped to match the pair of cut-out portions and an optical assembly receiving surface shaped to receive and support the laterally extending mounting projection, wherein when assembled the disk like lens portion covers the first light exiting aperture.

Still further, it is proposed that the second optical assembly comprises at least 3 optical components, wherein preferably the second optical assembly comprises a first lens, a logo sheet, a second lens, and a cap portion comprising the second light exiting portion, a collar and a mounting projection extending laterally from the collar, and the front face of the second housing comprises a light exiting aperture defined by a circular shoulder that the collar rests upon and an optical assembly receiving surface shaped to receive and support the laterally extending mounting projection.

In addition, embodiments of the present disclosure can be characterized in that the first lens is mounted on the printed circuit board above the first light source and supports the logo sheet and the second lens, and the second lens comprises a projection on the top surface that engages the underside of the front face.

It is also proposed that the light source is at least one LED, with preferably the at least one LED being at least one white LED.

It is proposed that the first light exiting surface and the second light exiting surface each have an area of less than 200 mm$^2$, and/or the first optical assembly is mounted over the first light source and the second optical assembly is mounted over the second light source.

In another aspect, an approach lamp module for use in the system according to the present disclosure is used to replace an installed approach lamp module, wherein the installed approach lamp module is the first approach lamp module and the approach lamp module is the second approach lamp module, or the installed approach lamp module is the second approach lamp module and approach lamp module is the first approach lamp module.

It is proposed that the approach lamps module is characterized by an adjusting device for spatially adjusting the module relative to a housing part of the external rear view assembly, wherein the adjusting device preferably comprises at least one first adjusting element being arranged at the module or formed together with a module housing and/or provides at least an translational degree of freedom along at least one shifting axis and/or at least one rotational degree of freedom around at least one rotational axis.

In addition, an external rear view assembly for a motor vehicle with a system of the present disclosure is provided.

The adjusting device may comprise at least one second adjusting element that is arranged at and/or formed together with a holding device for the module and/or the housing part, and/or the adjusting device comprises at least one fixing element for fixing the module in a position adjusted by means of the adjusting device, preferably via at least one fixing screw and/or bonding.

In another aspect, a method of replacing an installed approach lamp for use in the system according to the invention, includes: obtaining an approach lamp module, wherein the approach lamp module is either a first approach lamp module or a second approach lamp module of the system; removing an installed approach lamp module from a side mirror housing, wherein the installed approach lamp module is either the second approach lamp module or the first approach lamp module of the system; and installing the obtained approach lamp module.

BRIEF DESCRIPTION OF DRAWINGS

The foregoing summary, as well as the following detailed description, will be better understood when read in conjunction with the appended drawings. For the purpose of illustration, certain examples of the present disclosure are shown in the drawings. It should be understood, however, that the present disclosure is not limited to the precise arrangements and instrumentalities shown. The accompanying drawings, which are incorporated in and constitute a part of this specification, illustrate an implementation of system, apparatuses, and methods consistent with the present disclosure and, together with the detailed description, serve to explain advantages and principles consistent with the present disclosure, wherein:

FIG. 2D is a proximal end view of the approach lamp of FIG. 2A;

FIG. 2E is a distal end view of the approach lamp of FIG. 2A;

In the following description, like reference characters designate like or corresponding parts throughout the figures.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

It is to be understood that the phraseology and terminology employed herein are for the purpose of describing the present disclosure and should not be regarded as limiting. For example, the use of a singular term, such as, "a" is not intended as limiting of the number of items. Also the use of relational terms, such as but not limited to, "top," "bottom," "left," "right," "upper," "lower," "down," "up," "side," are used in the description for clarity and are not intended to limit the scope of the present disclosure or the appended claims. Further, it should be understood that any one of the features can be used separately or in combination with other features. Other systems, methods, features, and advantages of the present disclosure will be or become apparent to those skilled in the art upon examination of the description. It is intended that all such additional systems, methods, features, and advantages be included within this description, be within the scope of the present disclosure, and be protected by the accompanying claims.

Figure 1A:
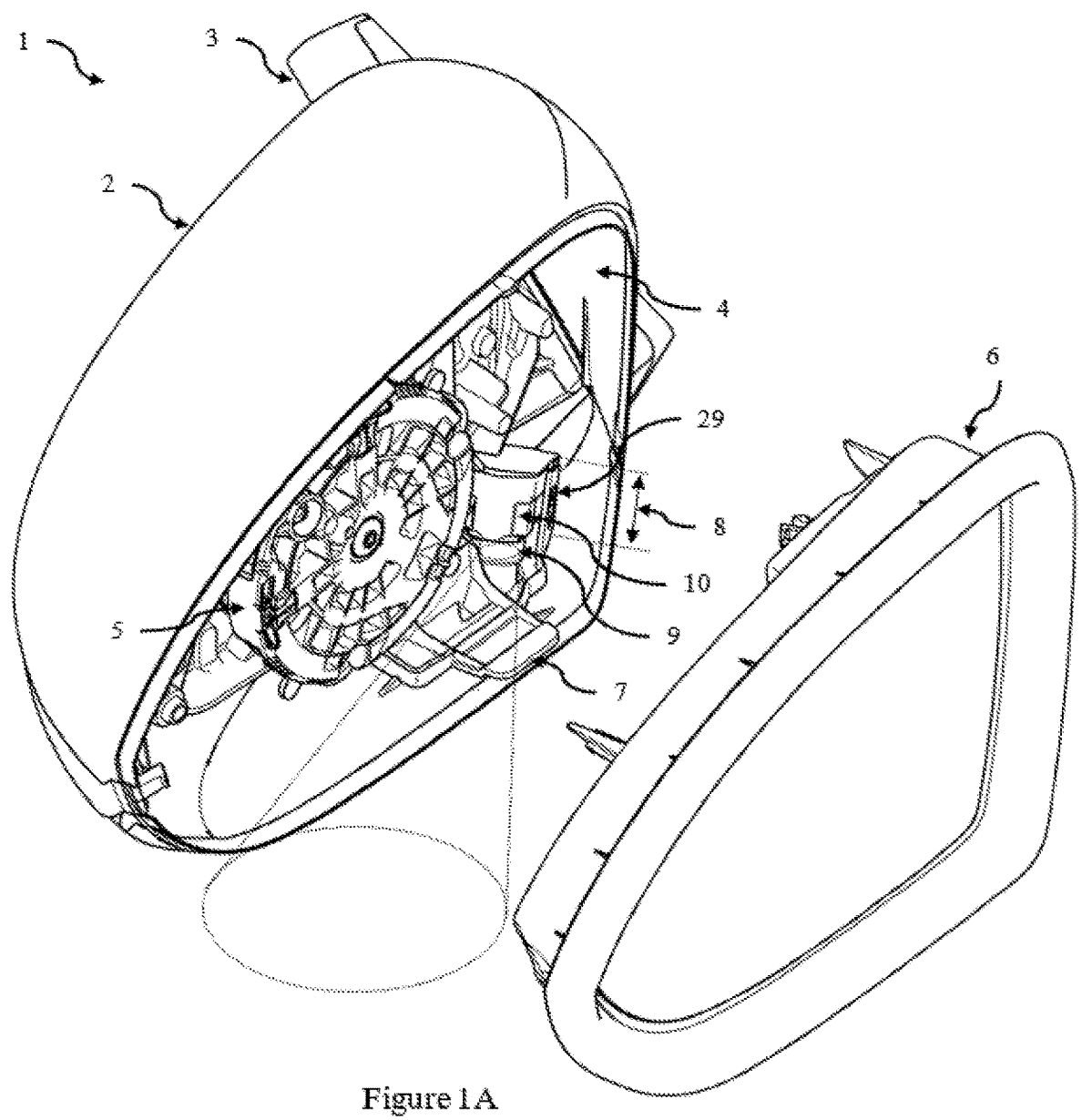
FIG. 1A is a isometric view of a rear view side mirror according to an embodiment.

Referring now to FIG. 1A, there is shown an external rear view assembly in form of a rear view side mirror system 1 adapted for providing interchangeable approach lamps according to an embodiment. Interchangeability is obtained through the specific design of the optical assemblies and the housing.

The side mirror comprises a forward housing 2 and mounting arm 3 and mirror 6. A side mirror assembly is located with the interior cavity 4 of the forward housing 2 and houses the mirror support 5 (for mirror 6). Additional components such as indicator LEDs may also be present within the interior cavity 4 of the forward housing 2. In this embodiment the side mirror assembly comprises a common interface component or adaptor 7 which is mounted to the base of the interior of the side mirror housing 2. The common interface 7 comprises a pair of receiving mounting surfaces 79 for mounting a common pair of mounting surfaces 29 on an approach lamp module 10 which may be a standard approach lamp module 11 or a projecting approach lamp module 12.

Figure 1B:
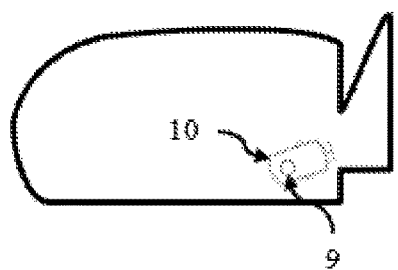
FIG. 1B is an under side view of the rear view side mirror according to an embodiment.
Figure 1C:
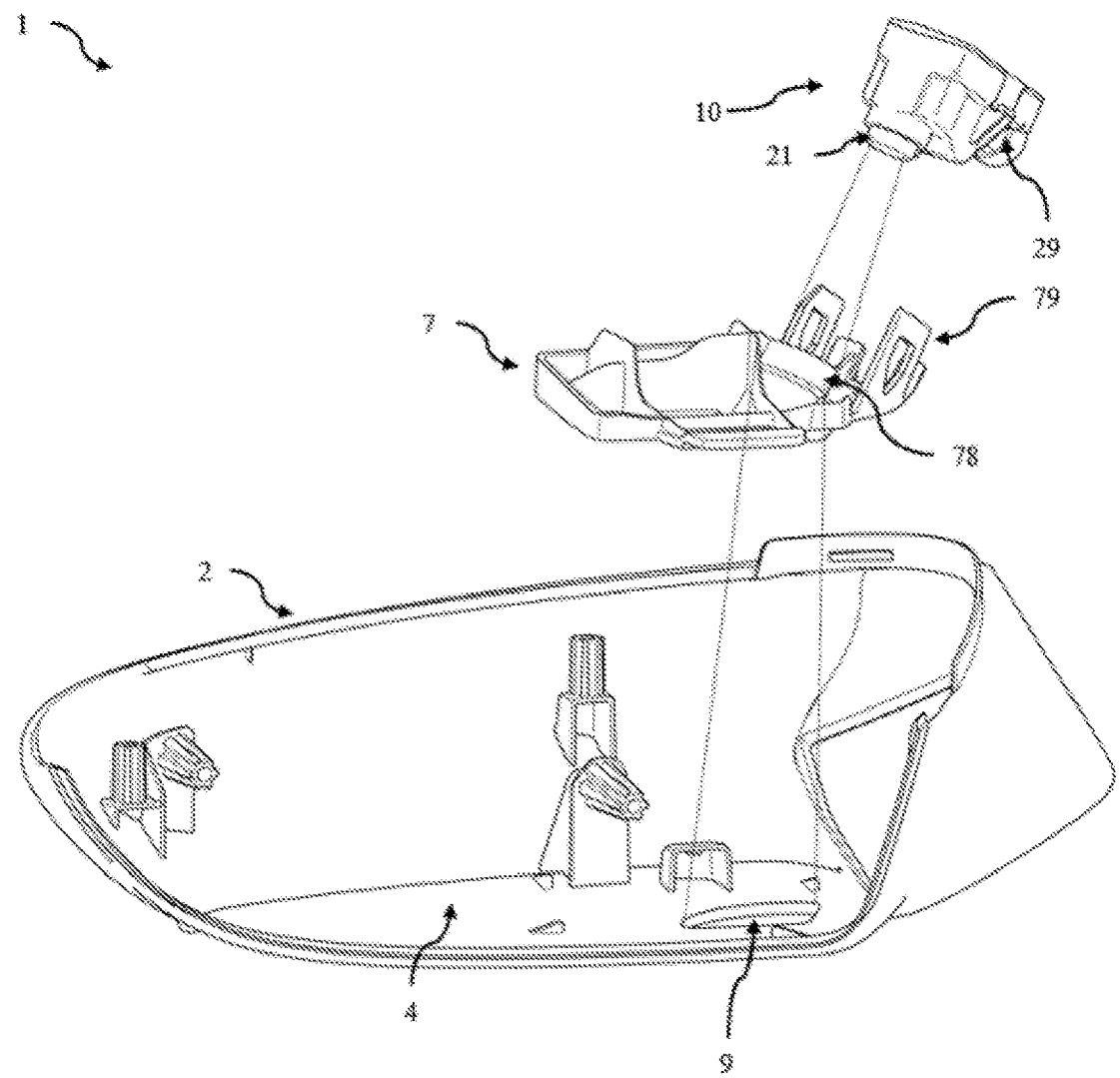
FIG. 1C is an exploded view of the approach lamp, common interface adapter and interior cavity of a side mirror housing according to an embodiment.

Each of the approach lamp modules 10 have a light exiting surface that project light through an external aperture 9 in the side mirror housing to the adjacent ground. The distance from the rear face to light exiting aperture is identical for each approach lamp. Additionally in this embodiment the shape, profile and dimensions of each approach lamp (standard approach lamp 11 and projecting approach lamp 12) is substantially identical. This is further illustrated in FIG. 1B which is an under side view of the rear view side mirror according to an embodiment. This shows the outline (or profile or shape) of the rear (or front) face of the housing with the location of the external aperture 9 indicated. FIG. 1C is an exploded view of an approach lamp module 10, the common interface adapter 7 and the interior cavity 4 of the side mirror housing 2 showing the alignment and recessing of the light exiting surface 21 of the approach lamp with the light exiting aperture 9. As can be seen in this figure, the approach lamp module 10 can be clipped into and retained in the common interface adapter 7 via the receiving mounting surfaces 79. The mounting surfaces 29 of the approach lamp module 10 deflect the receiving mounting surfaces 79 on the common interface adapter 7 until they are located within apertures in the receiving mounting surfaces 79 which then resiliently spring back to retain the approach lamp 10 in place. As can be further seen in this figure the exterior housing 2 has the aperture 9 and the common interface adapter 7 has walls 78 to form a recessed tunnel which receives the light exiting surface 21 of the approach lamp 10.

Figure 2A:
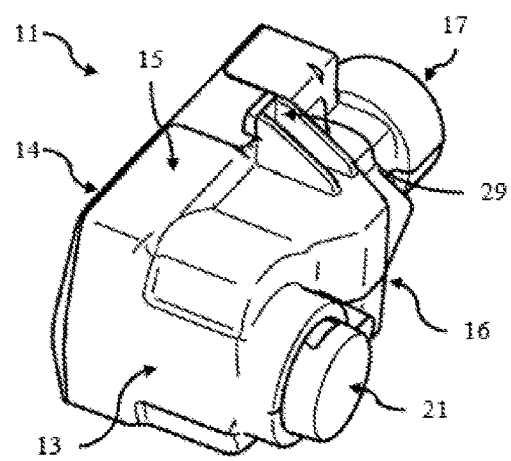
FIG. 2A is an isometric view of an approach lamp according to an embodiment.
Figure 3A:
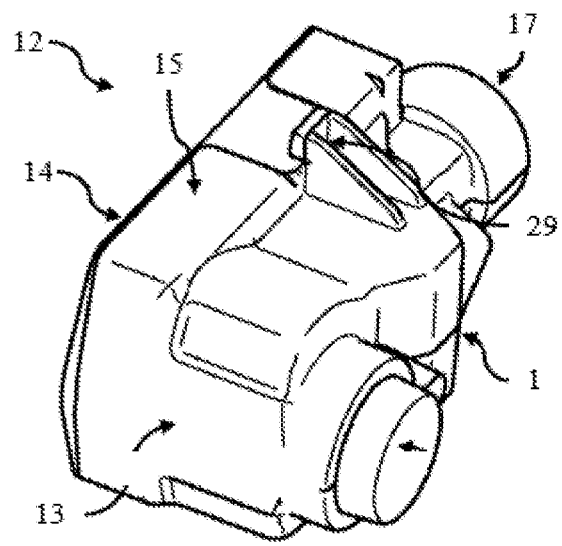
FIG. 3A is an isometric view of an logo lamp according to an embodiment.
Figure 4A:
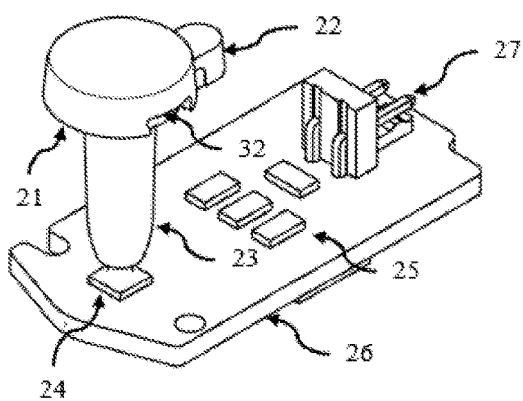
FIG. 4A is an isometric view of the internal components of the approach lamp of FIG. 2A.
Figure 4B:
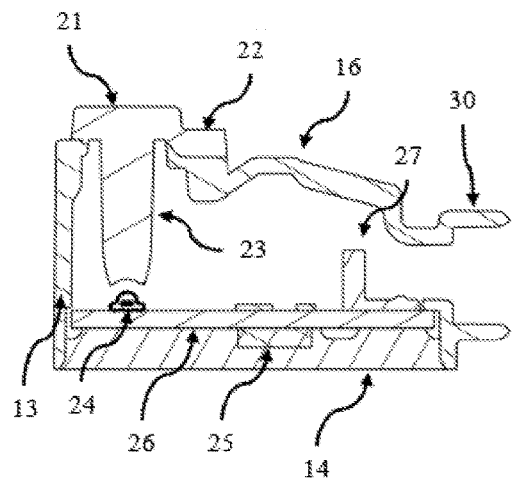
FIG. 4B is a section view of section AA of FIG. 2C.
Figure 5A:
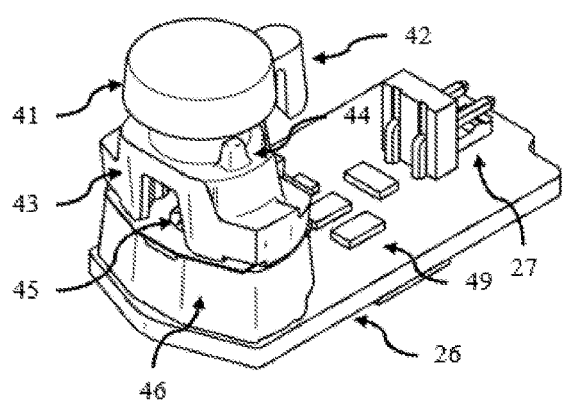
FIG. 5A is an isometric view of the internal components of the logo lamp of FIG. 3A.
Figure 5B:
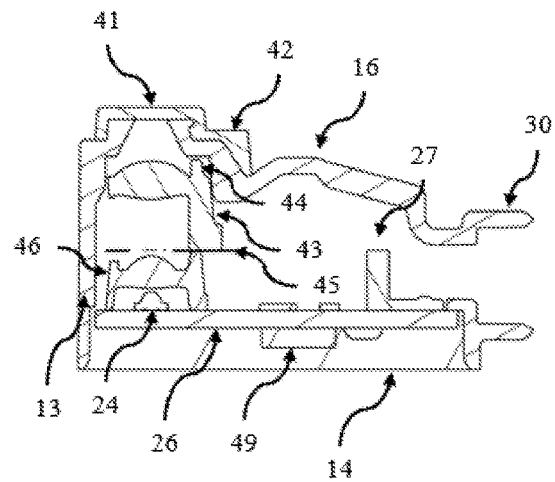
FIG. 5B is a section view of section BB of FIG. 3C.

An embodiment of a standard approach lamp 11 is shown in FIGS. 2A to 2H, comprising isometric, exploded isometric, front, proximal end, distal end, first side, second side and rear views respectively. FIG. 4A is an isometric view of the internal components of the approach lamp of FIG. 2A and FIG. 4B is a section view of section AA of FIG. 2C. Similarly an embodiment of a projecting or logo approach lamp 12 is shown in FIGS. 3A to 3G comprising isometric, exploded isometric, front, proximal end, distal end, first side and second side views. FIG. 5A is an isometric view of the internal components of the logo lamp of FIG. 3A and FIG. 5B is a section view of section BB of FIG. 3C.

Figure 2B:
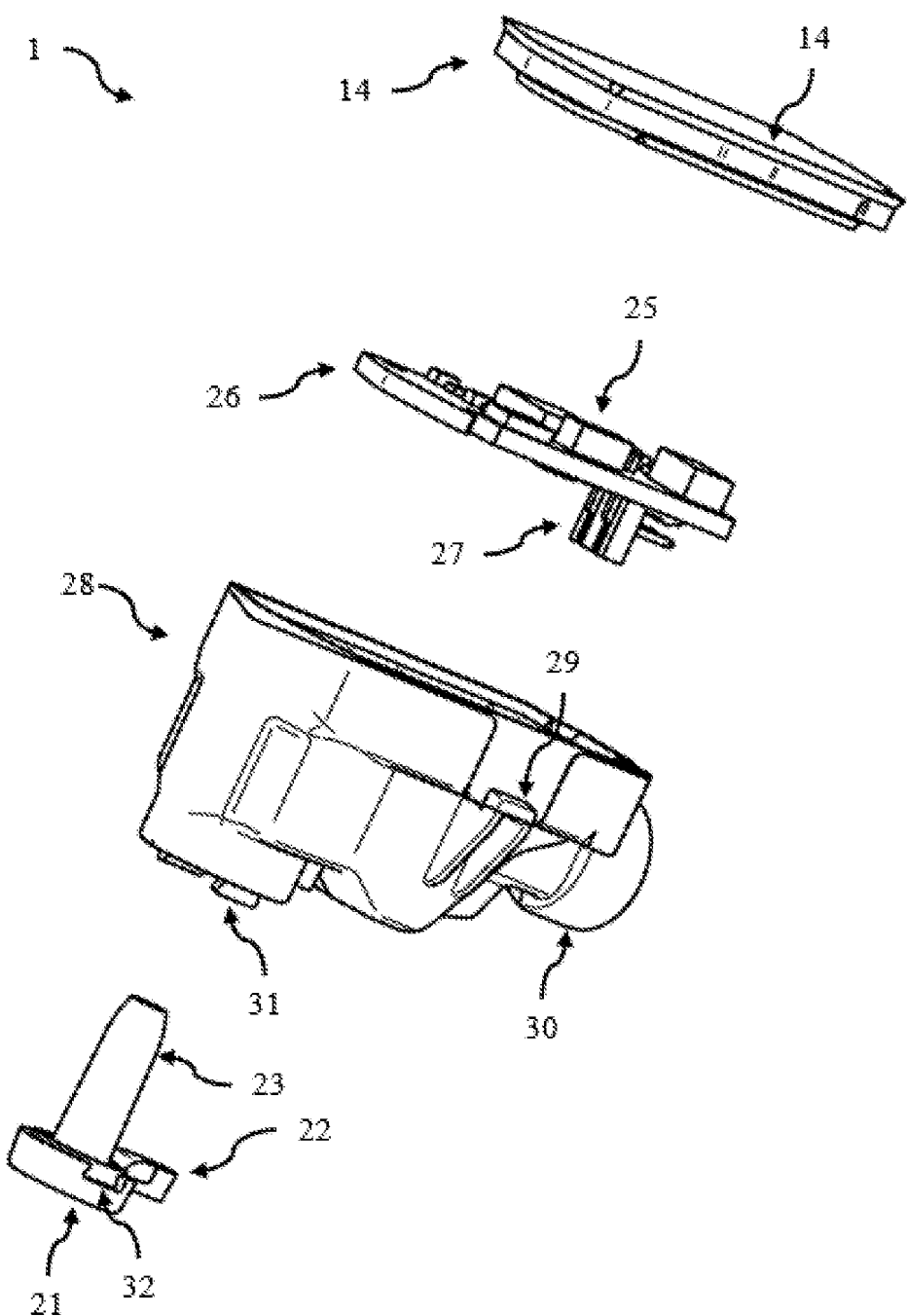
FIG. 2B is an exploded isometric view of the approach lamp of FIG. 2A.

As shown in FIGS. 2A and 2B each of the housings comprises a front face 16, a rear face 14, a first side face 15, a second side face 18, a proximal face 17 and a distal face 13. The proximal face 17 comprises a connector housing 30 with an aperture for receiving a power cable (this defines the proximal side, which is proximal to support arm 3). However in other embodiments the connector housing 30 may be located on any other face as required depending upon the location of the power connector 27 in the side mirror assembly. A light exiting surface 21 projects out of the front face 16 of the housing. The size and shape of the light existing surface 21, and the distance from the light exiting surface 21 to the rear face 14 is identical for both the standard approach lamp 11 and the projecting approach lamp 12.

The pair of mounting surfaces (or features, or arrangements) 29 extends from the housing—one extending from the first side face 15 and one extending from the opposing second side face 18. As can be seen in FIGS. 2A and 3A these are located on identical locations on the two housings. In this embodiment they comprise a pair of ribs that support a mounting plate. This can then be secured to a matching mounting surface on the common interface, for example by a clipping engagement, gluing, screwing, welding or some other fixing combination. In other embodiments a single mounting surface is provided, and in other embodiments more than 2 (eg 4 or 6) mounting surfaces are provided.

Figure 3B:
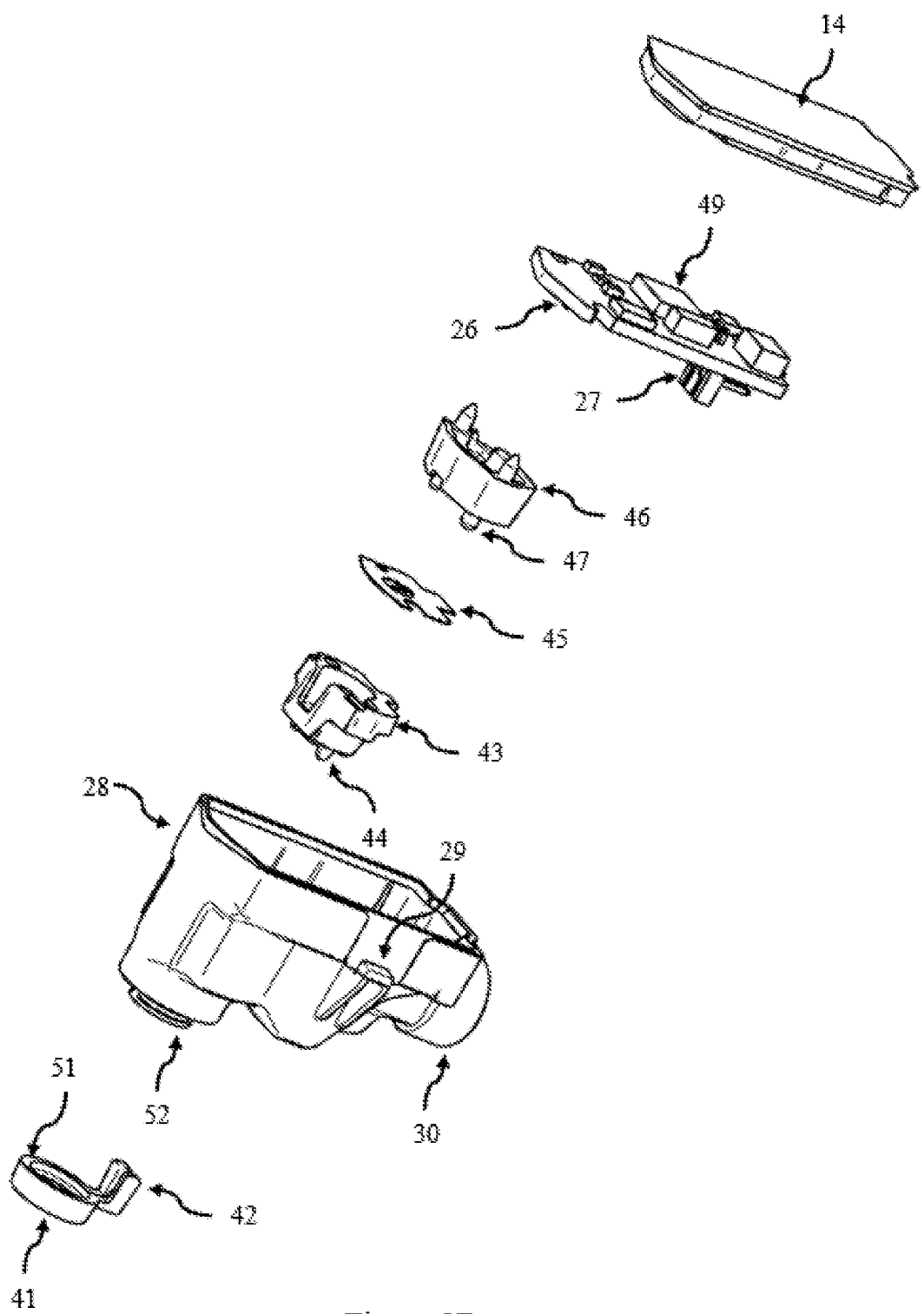
FIG. 3B is an exploded isometric view of the logo lamp of FIG. 3A.
Figure 3C:
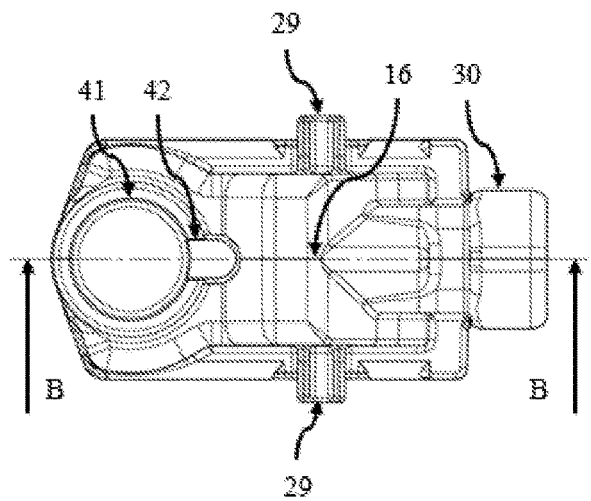
FIG. 3C is a front view of the logo lamp of FIG. 3A.
Figure 3D:
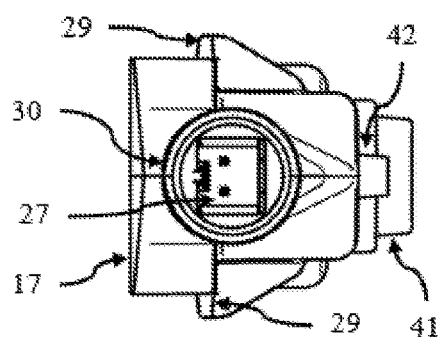
FIG. 3D is a proximal end view of the logo lamp of FIG. 3A.
Figure 3E:
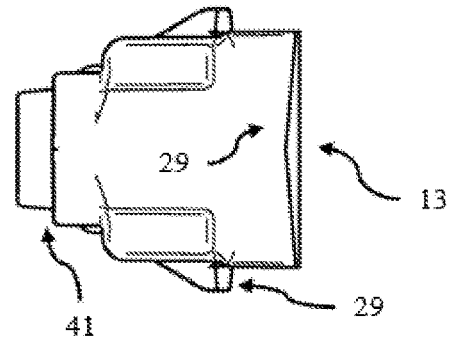
FIG. 3E is a distal end view of the logo lamp of FIG. 3A.
Figure 3F:
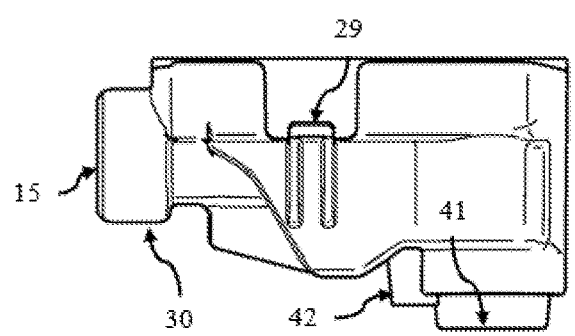
FIG. 3F is a first side view of the logo lamp of FIG. 3A.
Figure 3G:
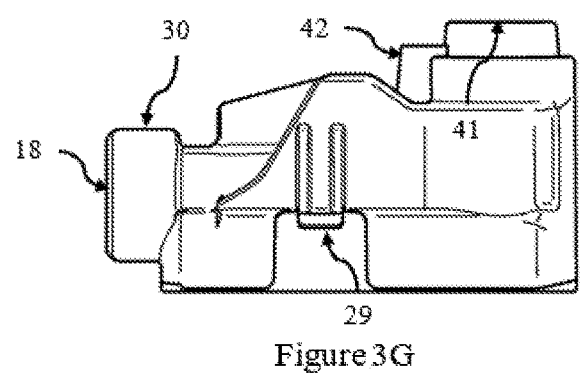
FIG. 3G is a second side view of the logo lamp of FIG. 3A.

FIGS. 2B and 3B show exploded views of the standard approach lamp 11 and projecting approach lamp 12. The two housing share a commonly shaped rear face plate 14 which supports a common printed circuit board (PCB) 26. The PCB and mounted components are shown in more detail in FIGS. 4A, 4B, 5A and 5B. Each PCB 26 comprises a commonly located light source 24, an electronic circuit 25 and 49, and a common power connector 27. In this embodiment the profile (or shape) of the PCB 26 is the same for each approach lamp. However in other embodiments the profile could be different for each of the approach lamps. Using different profiles may assist during manufacture to ensure the correct PCB is identified and placed in the correct approach lamp, as the electronics will be specific to the approach lamp. In such embodiments where the profiles are different, the profiles could still share common shaped regions to enable mounting of each PCB to a common rear face plate 14. That is whilst the exact profile or shape may differ for the two lamp types, the PCBs 26 may use the same mounting arrangement or mounting locations with respect to the common rear face plate 14. Alternatively separate rear face plates 14 may be used for each approach lamp, which whilst having a common exterior profile, has an inner side configured to support the appropriate PCB the rear face plate 14 is to support. Each of the optical assemblies for the approach lamp modules are mounted to receive light from the light source 24. The optical assemblies may be mounted either fully or partially over the light source 24 to receive (or collect) light emitted by the light source and directing and/or focussing the light through the optical assembly and out a light exiting portion of the optical assembly. Alternatively the optical assembly may be mounted in such a way, for example using an off axis collecting component, that it is capable of receiving (or collecting) light emitted by the light source and directing and/or focussing the light through the optical assembly and out a light exiting portion of the optical assembly. The power connector 27 is located proximal to a connector housing 30 that receives the power cable from the side mirror assembly (via the support arm 3). The light source may be a white LED, although other light sources or additional LEDs could be included. The electronic circuit 25 for the standard approach lamp may be identical to the electronic circuit 49 for the projecting lamp, or the electronic circuit 49 for the projecting lamp may be different (typically more complex) in order to produce the required light to project a logo.

Figure 2C:
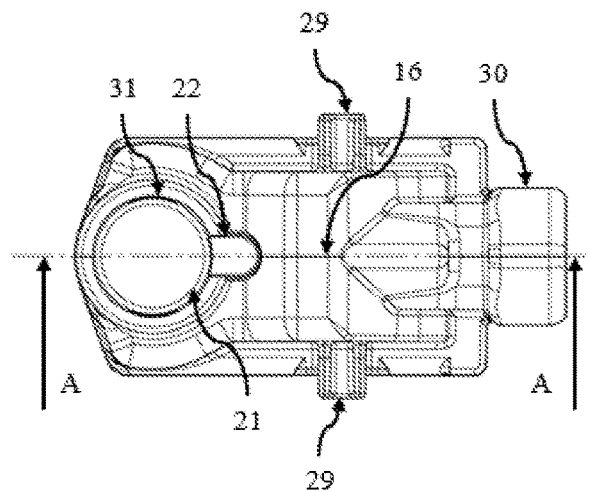
FIG. 2C is a front view of the approach lamp of FIG. 2A.
Figure 2F:
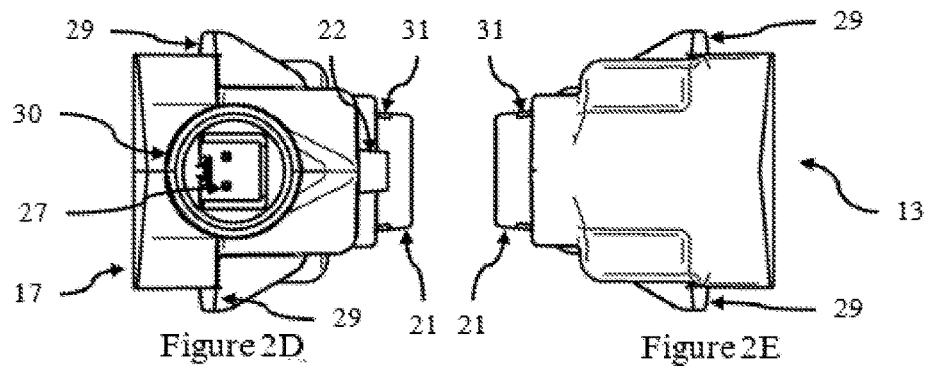
FIG. 2F is a first side view of the approach lamp of FIG. 2A.
Figure 2F:
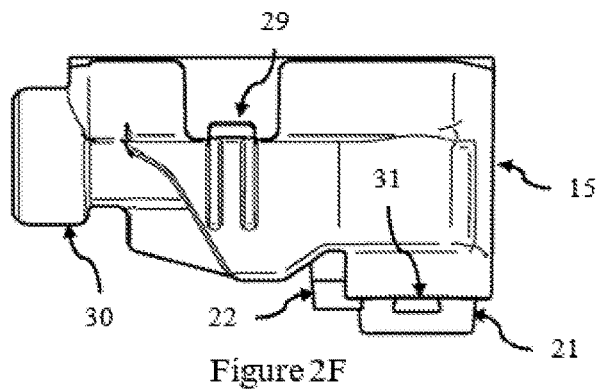
Figure 2G:
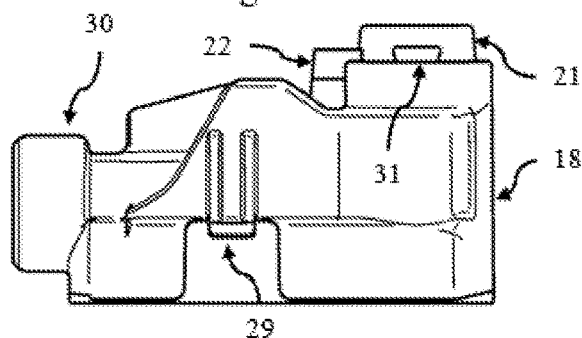
FIG. 2G is a second side view of the approach lamp of FIG. 2A.
Figure 2H:
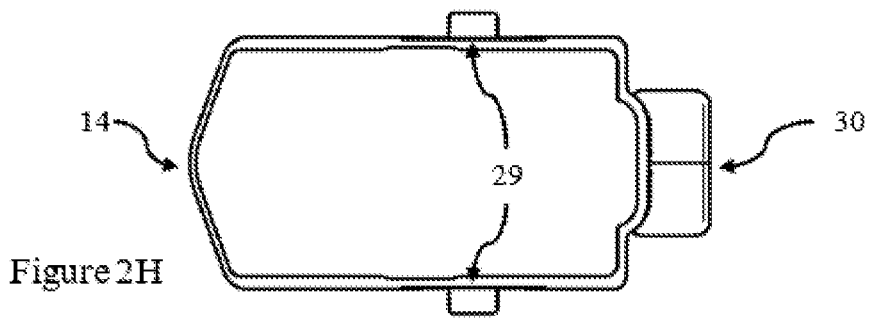
FIG. 2H is a rear view of the approach lamp of FIG. 2A.

In this embodiment the first optical assembly is moulded as a single piece and is mounted over the light source 24. The optical assembly comprises a first light exiting portion 21 formed as a disk like lens portion with a pair of cut-out locating portions 32, and a stem portion 23 extending down from the disk like lens portion 21. Additionally an injection moulding gate 22 is shown extending laterally from the disk like lens portion 21. This is shown in FIGS. 2B and 4A and 4B which is a sectional view through section AA of FIG. 2C. The front face 16 comprises an aperture with a pair of locating projections 31 shaped to match the pair of cut-out portions 32 and an optical assembly receiving surface shaped to receive and support the laterally extending mounting projection of the stem portion 23. As can be seen in FIG. 2C when assembled the disk like lens portion 21 covers the aperture in the front face 16. The locating projections 31 may clip into the cut-out portions 32 to retain the disk like lens portion 21 in place; additionally the disk like lens portion 21 may be glued, welded, bonded or otherwise fixed to the optical assembly receiving surface 16 to secure the optical assembly in place. In this embodiment the optical assembly is a single piece, but in another embodiment the optical assembly could be formed as two pieces, such the stem portion 23 and an upper portion comprising the disk like lens portion 21 (and the injection moulding gate 22). Typically in standard approach lamps, the light source is located as close as possible to lens portion 21 and exit aperture. However in the current arrangement the stem portion 23 acts as a light pipe and the length is selected matched to the required size of the optical assembly for the projecting approach lamp so that optical assemblies have the same approximate size (or occupy the same or similar volumes). This arrangement trades off efficiency of light generation (for the standard approach lamp) for the benefit of identical housing geometry to enable easy interchangeability of the approach lamps thus providing reduced easier installation and cost savings during manufacture.

The optical assembly for the projecting approach lamp is more complex than the optical assembly for the standard approach lamp and comprises at least 3 optical components. In this embodiment the optical assembly for the projecting approach lamp comprises a first lens 46 mounted over the light source 24 and supports a logo sheet or mask 45 via projections 47. The first lens also supports a second lens 43. This is shown in FIGS. 3B and 5A and 5B which is a sectional view through section BB of FIG. 3C, A projection 44 on the top surface of the second lens engages the underside of the front surface 16. A cap portion comprising an optically transparent light exiting portion 41, a collar 51 and an injection moulding gate 42 extending laterally from the collar 51 rest on the front face 16. The front face 16 comprises an aperture defined by a circular shoulder 52 that the collar 51 rests upon. Further the front face is configured to receive and support the injection moulding gate 42. A logo sheet 45 may be a passive mask element such a transparent flat sheet with the vehicle manufacturer logo or image printed onto it to project a static image, or the logo could be an active element such as an LCD matrix which can project multiple images or alter a projected image.

In one embodiment the light exiting aperture 21, or in particular the apparent surface of white light, is less than 200 $mm^2$. An additional constraint is that the light source should be hidden from view from certain viewing angles, such as from above or approaching horizontal to meet light emission regulations. A maximum size of 200 $mm^2$ is sufficient to generate sufficient light (to meet functional requirements), whilst being small enough to allow the light surface to be recessed and hidden (within the confines of the mirror housing) and meet light emission regulations. In another embodiment the optical assembly in the standard approach lamp is made identical to the optical assembly in the logo approach lamp except for the removal of the logo or mask. This increases the part count and cost, but simplifies assembly as only one change is required (ie to include or omit the logo sheet 45).

As can be seen from these figures the locations of each of the first set of mounting surfaces and the locations of each of the second set of mounting surfaces are identical. Similarly the location and size of the light exiting surfaces are identical as are the locations of the light source (all relative to the locations of each of the first set of mounting surfaces). This arrangement ensures that a distance from the rear face 14 to the light exiting surface 21 is the same in both approach lamps so that in use, each of the approach lamp modules can be mounted in the same location in the side mirror assembly and project light through the same external aperture 9 in the side mirror assembly to allow easy interchanging of the approach lamp modules.

In this embodiment the overall size, shape, profile of each assembled lamp module is substantially identical (ie FIG. 2A looks substantially identical to FIG. 3A). However in some embodiments small design modifications to the shape or profile of the approach lamps could be made to assist installers in identifying whether an approach lamp module 10 is a standard approach lamp module 11 or a logo approach lamp module. Such modifications would not affect the gross volume or dimensions (or gross shape) of the mounting locations 29, PCB board size 26, light source location 24, power connector 27 and aperture 30, the optical assemblies or the location and size of the light exiting surface 21. However additional ridges, surface patterns or small projections located near the mounting surfaces on the first and second side surfaces 15, 18 or on the top or front surface 16 providing tactile feedback to an operator. Additionally or alternatively words (eg "Logo", "Standard") could be printed or moulded into the surface.

Embodiments of a system for providing interchangeable approach lamps for use with a rear view side mirror assembly are described. Interchangeability is obtained through the specific design of the optical assemblies and the housing. The system comprises two approach lamp modules—one comprising a standard approach lamp, and the second comprising a projecting (or logo) approach lamp. Each of the approach lamp housings are substantially identical with common mounting points to the side mirror assembly and a common light exit aperture or surface to direct light out through a common aperture in the side mirror. A PCB is used which mounts the light source in the same location, and each case the optical assemblies are designed to focus light through the common aperture, and thus occupy the same height (ie in each case the light exit aperture or apparent surface is a common distance from the light source).

The system facilitates the interchanging of a standard approach lamp with a logo lamp using the same side mirror assembly (ie using the same fixed mounting points and external aperture). As only one side mirror assembly is required, as compared to prior art systems which require one side mirror assembly for each approach lamp type, the current system simplifies installation (and later changes) and reduces part count and cost allowing both a standard approach lamp and a projector approach lamp to easily be offered to customers. The system could be provided in kit form (ie individual components for assembly). Further each of the individual approach lamps (standard 20 and logo 40) could be supplied separately as either an initial installation or as a replacement (or upgrade) kit to allow interchanging of an installed approach lamp with the other variant. For example an upgrade kit may contain a logo approach lamp 40 for replacing an installed standard approach lamp 20 (or vice versa). This gives rise to a method of replacing an installed approach lamp. In this method an installer first obtains an approach lamp. This can be either a standard approach lamp 20 or a logo approach lamp 40. The installed approach lamp (which may be either a standard approach lamp 20 or a logo approach lamp 40) is then removed from a side mirror housing, and the obtained approach lamp is installed to replace it.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the disclosure is not restricted in its use to the particular application or applications described. Neither is the present disclosure restricted in its preferred embodiment with regard to the particular elements and/or features described or depicted herein. It will be appreciated that the disclosure is not limited to the embodiment or embodiments disclosed, but is capable of numerous rearrangements, modifications and substitutions without departing from the scope as set forth and defined by the following claims.

REFERENCE LIST

1 rear view side mirror system
2 forward housing
3 mounting arm
4 interior cavity
5 mirror support
6 mirror
7 common interface component or adaptor
9 external aperture
10 approach lamp module
11 standard approach lamp module
12 projecting approach lamp module
13 distal face
14 rear face
15 first side face
16 front face
17 proximal face
18 second side face
21 light exiting surface
22 injection moulding gate
23 stem portion or mounting projection
24 light source
25 electronic circuit
26 printed circuit board
27 power connector
29 pair of mounting surfaces
30 connector housing
31 pair of locating projections
32 pair of cut-out locating portions
41 light exiting portion
42 injection moulding gate
43 second lens
44 projection
45 logo sheet
46 first lens 49 electronic circuit
51 collar
52 circular shoulder
78 walls
79 pair of receiving mounting surfaces

The invention claimed is:

1. A system for providing interchangeable approach lamps for use with an external rear view assembly mounted to a motor vehicle, the system comprising:
 a first approach lamp module, comprising:
  a first housing comprising a front face, a rear face, a first side face, a second side face, a proximal face, and a distal face, the proximal face comprising an aperture for receiving a power cable;
  a first set of mounting surfaces located on the first housing, the first set of mounting surfaces comprising one or more mounting surfaces;
  a first printed circuit board mounted adjacent the rear face of the first housing, the first printed circuit board further comprising a power connector, a first electronic circuit and a first light source mounted on the first printed circuit board;
  a first optical assembly mounted to receive light from the first light source and comprising a first light exiting surface projecting out of the front face of the first housing; and
 a second approach lamp module comprising:
  a second housing comprising a front face, a rear face, a first side face, a second side face, a proximal face and a distal face, the proximal face comprising an aperture for receiving a power cable;
  a second set of mounting surfaces located on the second housing, the second set of mounting surfaces comprising one or more mounting surfaces;
  a second printed circuit board mounted adjacent the rear face of the second housing, the second printed circuit board further comprising a power connector, a second electronic circuit and a second light source mounted on the second printed circuit board,
  a second optical assembly mounted to receive light from the second light source and comprising a projection assembly for projecting a logo or a mask, and a second light exiting surface projecting out of the front face of the second housing,
 wherein the second approach lamp module differs from the first approach lamp module by being a projecting or logo approach lamp module due to its projection assembly for projecting a logo or a mask,
 wherein, in use, with the external rear view assembly locations of each of the first set of mounting surfaces and each of the second set of mounting surfaces are identical, a location and a size of the first light exiting surface is identical to a location and a size of the second light exiting surface, and a location of the first light source is identical to a location of the second light source so that a distance from the rear face of the first housing to the first light exiting surface is the same as a distance from the rear face of the second housing to the second light exiting surface, each location relative to the locations of each of the first set of mounting surfaces, and
 wherein, in use, each of the first approach lamp module and the second approach lamp module are mounted in a same location in the external rear view assembly and project light through an external aperture in the external rear view assembly to allow interchanging of the approach lamp modules.

2. The system of claim 1, wherein at least one of
 a profile shape of the first printed circuit board is the same as a profile shape of the second printed circuit board, and
 a shape of the first printed circuit board is the same as a shape of the second printed circuit board with the location of the power connector and light source on each printed circuit board being identical so that for both the first and second approach lamp modules the location of the power connector relative to the aperture for receiving a power cable is identical.

3. The system of claim 1, wherein a shape of the assembled first approach lamp module is the same as a shape of the assembled second approach lamp module.

4. The system of claim 1, wherein each of the first and second housing comprises a pair of mounting surfaces, one located on the respective first side face and one located opposite on the respective second side face.

5. The system of claim 1, wherein the system further comprises an interfacing component comprising one or more mounts for mounting the interfacing component to an external rear view assembly, and a set of mounting surfaces matching the first set of mounting surfaces on the first housing and the second set of mounting surfaces on the second housing.

6. The system of claim 1, wherein the first optical assembly is either molded as a single piece or as two pieces.

7. The system of claim 1, wherein the first light exiting portion comprises
 a disk like lens portion with a pair of cut-out locating portions;
 a stem portion extending down from the disk like lens portion; and
 a mounting projection extending laterally from the disk like lens portion, and
 wherein the front face of the first housing comprises a light exiting aperture with a pair of locating projections shaped to match the pair of cut-out portions and an optical assembly receiving surface shaped to receive and support the laterally extending mounting projection, and
 wherein, when assembled, the disk like lens portion covers the first light exiting aperture.

8. The system of claim 1, wherein the second optical assembly comprises at least three optical components,
 wherein the second optical assembly comprises
  a first lens;
  a logo sheet;
  a second lens; and
  a cap portion comprising the second light exiting portion, a collar, and a mounting projection extending laterally from the collar, and
 wherein the front face of the second housing comprises a light exiting aperture defined by a circular shoulder that the collar rests upon and an optical assembly receiving surface shaped to receive and support the laterally extending mounting projection.

9. The system of claim 8, wherein the first lens is mounted on the printed circuit board above the first light source and supports the logo sheet and the second lens, and the second lens comprises a projection on the top surface that engages the underside of the front face.

10. The system of claim 1, wherein the light source is at least one LED or at least one white LED.

11. The system of claim 1, wherein at least one of
 the first light exiting surface and the second light exiting surface each have an area of less than 200 mm$^2$, and the first optical assembly is mounted over the first light source and the second optical assembly is mounted over the second light source.

12. An external rear view assembly for a motor vehicle with the system of claim 1.

13. The external rearview assembly of claim 12, further comprising an adjusting device for spatially adjusting the first or second approach lamp module relative to a housing part of the external rear view assembly.

14. The external rearview assembly of claim 13, wherein the adjusting device comprises at least one first adjusting element being at least one of
- arranged at the respective module or formed together with the respective module housing, and
- providing at least one translational degree of freedom along at least one of at least one shifting axis and at least one rotational degree of freedom around at least one rotational axis, or
- the adjusting device comprises at least one second adjusting element that is at least one of arranged at and formed together with a holding device for at least one of the respective module and the housing part.

15. The external rearview assembly of claim 13, wherein the adjusting device comprises at least one fixing element for fixing the respective module in a position adjusted using the adjusting device via at least one of a fixing screw and bonding.

16. A method of replacing an installed approach lamp for use in the system of claim 1, comprising:
- obtaining an approach lamp module, the approach lamp module being either a first approach lamp module or a second approach lamp module of the system;
- removing an installed approach lamp module from a side mirror housing, the installed approach lamp module being either the second approach lamp module or the first approach lamp module of the system; and
- installing the obtained approach lamp module.

* * * * *